United States Patent [19]

Sieber et al.

[11] 4,375,207
[45] Mar. 1, 1983

[54] TOP SPEED LIMITER FOR AN INTERNAL COMBUSTION ENGINE

[75] Inventors: Albrecht Sieber, Böblingen; Peter Schülzke, Hemmingen; Dieter Günther, Murr; Ulrich Steinbrenner, Stuttgart, all of Fed. Rep. of Germany

[73] Assignee: Robert Bosch GmbH, Stuttgart, Fed. Rep. of Germany

[21] Appl. No.: 179,184

[22] Filed: Aug. 18, 1980

Related U.S. Application Data

[63] Continuation of Ser. No. 954,953, Oct. 26, 1978, abandoned.

[30] Foreign Application Priority Data

Jan. 5, 1978 [DE] Fed. Rep. of Germany ....... 2800433

[51] Int. Cl.³ ............................................. F02D 31/00
[52] U.S. Cl. ................................... 123/333; 123/478; 123/351; 123/198 DB
[58] Field of Search ................... 123/333, 489, 198 D, 123/198 DB, 478, 351, 352

[56] References Cited

U.S. PATENT DOCUMENTS 3,736,910  6/1973  Raff ..................................... 123/333
4,117,815 10/1978  Ikeura ................................ 123/489

*Primary Examiner*—Ira S. Lazarus
*Attorney, Agent, or Firm*—Edwin E. Greigg

[57] ABSTRACT

The maximum speed in an internal combustion engine is limited by circuitry which can be adjusted to conditions requiring a lower-than-normal top speed, for example during initial delivery to the customer and during the break-in period of the engine. The top speed limiter includes a comparator for suppressing or altering the fuel injection pulses. As a feature of the invention, the reference signal applied to the comparator and representing the top engine speed can be changed either manually or on the basis of elapsed time or mileage.

11 Claims, 3 Drawing Figures

TOP SPEED LIMITER FOR AN INTERNAL COMBUSTION ENGINE

This is a continuation of application Ser. No. 954,953, filed Oct. 26, 1978 now abandoned.

FIELD OF THE INVENTION

The invention relates to an apparatus for limiting the top speed in an internal combustion engine. More particularly, the invention relates to an apparatus for examining signals related to the prevailing speed and to engage the fuel supply mechanism of the engine so as to limit the top speed. Still more specifically the invention provides for selective top speed limiting.

BACKGROUND OF THE INVENTION

Known in the art is an apparatus for limiting the top speed of the engine by comparing the actual and the limiting speed and for engaging the fuel injection valves whenever the prevailing engine speed exceeds the limiting value. For this purpose, there is provided in the known apparatus a speed transducer followed by a speed-to-voltage converter whose output signal is compared with a reference signal. Depending on the outcome of the comparison, the fuel injection pulses are suppressed, thereby forcing the engine speed to decrease. In the known apparatus, the top speed is set to be approximately 6500 rpm and no provision is made for changing or adjusting this limiting speed at any time during the operation of the vehicle. However, the constancy of the maximum speed in the known apparatus is a severe disadvantage because this speed is much too high in the break-in period of the engine, for example.

OBJECT AND SUMMARY OF THE INVENTION

It is a principal object of the present invention to provide a top speed limiting apparatus for use in an internal combustion engine in which the maximum or top speed is selectable. It is a concurrent object of the invention to provide a top speed limiter in which the top speed can be reduced during, for example, the transport of the vehicle from the manufacturer to the buyer and/or during the initial break-in period of the engine. The present invention may be used in association with an rpm limiting device already present so as to select a maximum engine speed on the basis of elapsed time or on the basis of elapsed vehicle mileage.

These objects are attained according to the invention by providing means for changing the reference speed applied to the input of the comparator which decides if the maximum speed has been exceeded. As a consequence of the features of the invention, the degree of top speed limitation can be adapted to individual or instantaneous conditions of the engine. For example, during the transport to the client, a very low engine speed may be chosen and somewhat higher speed for the initial break-in period which is however still somewhat lower than the normal maximum engine speed after break-in.

It is a particularly advantageous feature of the invention to make the switchover from one top speed to the other on the basis of mileage traveled by the vehicle or again on the basis of number of hours of operation. It is still a further feature of the invention that a favorable location for performing the top speed switchover is a point within the cable harness of the vehicle which permits a simple manipulation during service while at the same time preventing an unsuitable and unauthorized switchover on the part of the vehicle owner.

In a still further feature of the invention, excessive speeds are prevented by providing a timing circuit which completely suppresses fuel supply for a limited period of time or which shortens the length of the fuel injection pulses in a fuel injection system so that the total amount of fuel supplied to the engine is reduced during the entire time during which the engine operates at higher than maximum speed.

The invention will be better understood as well as further objects and advantages thereof become more apparent from the ensuing detailed description of two exemplary embodiments taken in conjunction with the drawing.

BRIEF DESCRIPTION OF THE DRAWING

FIG. 2b is a timing diagram related to the illustration of FIG. 2a.

DESCRIPTION OF THE PREFERRED EMBODIMENTS

Figure 1:
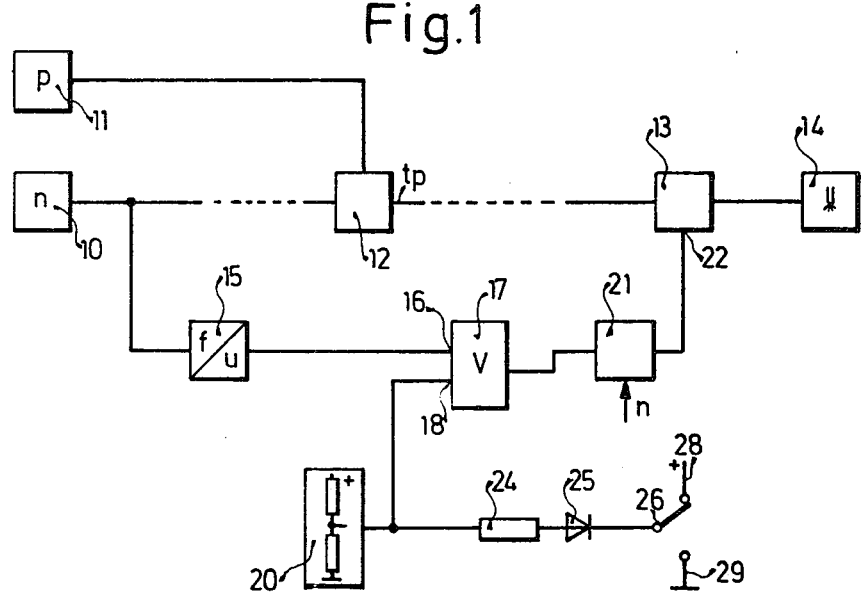
FIG. 1 is a block diagram of a first embodiment of the apparatus of the invention.

Turning now to FIG. 1, there will be seen a simplified representation of a fuel injection system as well as a circuit for limiting the top speed of the engine. A tacho generator 10 and a pressure transducer 11 generate signals which are applied to suitable inputs of a control multivibrator 12 whose output is a train of pulses related in frequency and pulse duration to the magnitude of the inputs from the transducers 10 and 11. This pulse train is the raw, uncorrected injection control pulse $t_p$. Normally, this pulse would be processed by various correcting circuits, not shown, and finally passes into a pulse suppressor or pulse blanking circuit 13. The output of the pulse suppressor circuit 13 actuates at least one electromagnetic fuel injection valve 14. As illustrated, the output signal of the tacho generator 10 is also applied to a frequency-to-voltage converter 15 whose output is an analog voltage applied to a first input 16 of a comparator 17 (such as Motorola 3302 P). The second input 18 of the comparator 17 receives the output signal from a reference voltage source 20. The output of the comparator 17 is applied to a timing circuit 21 (such as NE 555) which, in turn, connects to the control input 22 of the pulse suppressor circuit 13. The junction of the reference voltage 20 and the second input of the comparator 17 is further coupled via a resistor 24 and a diode 25 to a switch 26 which may be selectively connected to either the high or low supply voltage lines 28 or 29, respectively.

The timing element 21 may be a monostable multivibrator which, when triggered by the presence of a signal at the output of the comparator 17, indicating an excessive engine speed, will deliver a pulse of constant but selectable duration to the pulse suppressor circuit 13 (for example RCA 4016) which thereupon suppresses the fuel control pulses $t_p$ and shuts down the operation of the fuel injection valves 14. The unstable time constant of the monostable multivibrator 21 may be chosen to correspond in a suitable manner to the requirements of the desired vehicle characteristics and drivability.

The operation of the circuit illustrated in FIG. 1 is as follows:

The engine speed and pressure signals fed to the control multivibrator 12 are used to generate a pulse train $t_p$ which is corrected in a manner not further illustrated by suitable circuits on the basis of temperature and possibly other variables. Whenever the engine speed lies below the maximum permissible speed, the pulse suppressor circuit 13 provides a direct path to the fuel injection valves 14, which are therefore actuated periodically.

The engine speed signal is also applied to the input of the frequency-to-voltage converter 15 whose output voltage is applied to the input 16 of the comparator 17 which generates an output signal depending on the voltage difference at its two inputs 16 and 18. The reference voltage source 20 generates a voltage which corresponds to the maximum permissible engine speed for a normal and well broken-in engine. If the actual engine speed exceeds the maximum permissible speed, the comparator circuit 17 generates an output signal which causes the monostable multivibrator to switch over for a selectable period of time and thus causes the pulse suppressor circuit 13 to interrupt the electrical connection between the control multivibrator 12 and the injection valves 14. Accordingly, the electromagnetic valves are not actuated and the engine receives no fuel, causing a forcible speed reduction.

In a well broken-in engine, the switch 26 would be placed in the position illustrated, in which the cathode of the diode 25 is connected to the positive supply line 28. Under these circumstances, the diode 25 blocks and permits no current flow so that the voltage at the input 18 of the comparator 17 is determined exclusively by conditions within a voltage divider 20. However, in the initial operation of the engine, for example during the transport of a vehicle to the client, or during the break-in period of the vehicle, the switch 26 is placed in the opposite position where it makes contact with the low voltage source 29. In this position, the diode 25 conducts and the voltage at the input 18 is affected additionally by the current flowing through the resistor 24 which depends on that resistor's magnitude. Accordingly, the voltage at the input 18 drops and the effective top speed used as a reference value is also reduced. Accordingly, the fuel injection pulses are suppressed at a lower speed than the normal maximum speed.

In the simplest case, the switch 26 illustrated schematically in FIG. 1 may be merely a wire bridge. However, the place of the switch 26 may also be taken by a potentiometer which is adjusted, for example, in dependence on the vehicle mileage. Furthermore, the switch can be replaced by an electronic switching circuit which processes engine speed signals or other timing signals and which thus provides a time-dependent reference signal for the comparator 17.

The timing circuit 21 illustrated in FIG. 1 is seen to include an input for receiving an engine speed signal "n". This additional input is required whenever the fuel injection pulses are not completely suppressed by the pulse suppressor circuit 13, but only to be shortened. In such a case, the operation of the timing circuit 21 must be synchronized at the occurrence of the fuel injection control pulses or the engine rotation.

Figure 2A:
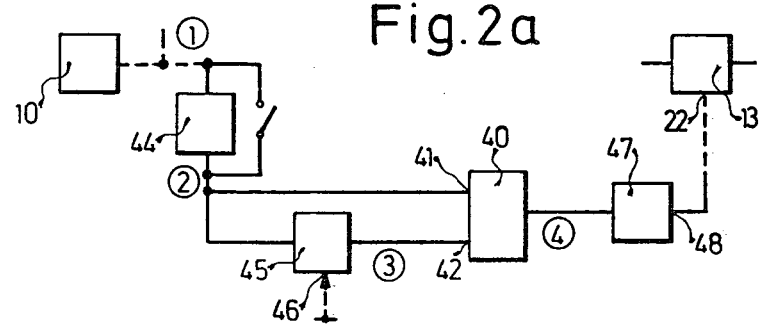
FIG. 2a is a block diagram of a second, digital embodiment of the apparatus of the invention.

A second and digital embodiment of the invention is illustrated in FIG. 2a. The elements 10 and 13 are identical to those previously described with respect to FIG. 1, i.e., they represent the engine speed transducer and the pulse suppressor circuits, respectively. The principal element in the embodiment of FIG. 2a is a comparator circuit 40 which is a logical selector circuit.

A first input 41 of the comparator 40 preferably receives a square pulse train from a frequency divider 44 whose sequence of pulse edges coincides with the output signal of the speed transducer 10. The second input 42 of the comparator 40 receives the output signal of an engine speed-triggered timing circuit 45 whose time constant may be changed in a similar manner as was the signal at the input 18 of the comparator 17 in the first embodiment of FIG. 1. The time constant of the timing circuit 45 is adjusted via an input 46. Following the comparator 40 is a further timing circuit 47 whose output 48 engages the input 22 of the pulse suppressor circuit 13, previously described.

Figure 2B:
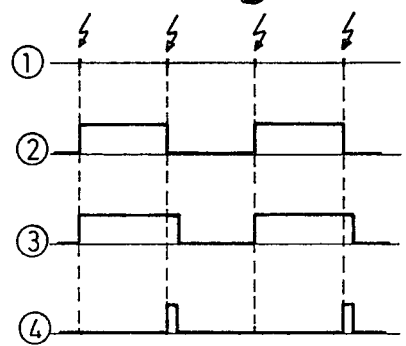

The operation of the circuit of FIG. 2a will now be described with the aid of the timing diagram in FIG. 2b. The numbered circles in FIG. 2a refer to the similarly numbered pulse trains in FIG. 2b. The pulse train 1 is an engine speed pulse train synchronous with the ignition pulses while the pulse train 2 is a square pulse train which represents the output signal from the frequency divider 44. The pulse train 3 is the output signal from the timing circuit 45 and the pulse train 4 represents the output signal of the comparator 40.

The internal circuitry of the comparator 40 is such that the comparator generates an output signal if and only if the maximum engine speed is exceeded, i.e., when the pulses in the pulse train 3 from the timer 45 have a greater length than the pulses in the engine speed signals in the pulse train 2. In the reverse situation, i.e., when the engine speed lies below the selected maximum speed, the output signal from the comparator 40 is suppressed.

The output of the comparator 40 triggers the second timing circuit 47 which then may be used to block or cancel the fuel injection control pulses for a given period of time.

The output signal of the comparator 40 may also be used directly for suppressing the fuel injection control pulses if the suppressor circuit 13 is suitably constructed to receive that signal.

What is claimed and desired to be secured by Letters Patent of the United States is:

1. A top speed limiter in combination with a fuel injection system for the breaking-in period of an internal combustion engine, a means for generating a pulse train which indicates engine speed, wherein the system includes a fuel supply means which receives the pulse train, and wherein the top speed limiter comprises:
   a timing circuit means for generating a selectable variable reference speed signal, wherein the circuit means includes a manually adjustable switch;
   means for adjusting said timing circuit means on the basis of an elapsed mileage signal;
   comparator means for comparing the reference speed signal with the pulse train and for generating a suppress command signal; and
   suppressor means for receiving the pulse train and the suppress command signal, wherein the suppressor means suppresses the pulse train to the fuel supply means to inhibit the supply of fuel to the system on receiving the suppress command signal.

2. An apparatus according to claim 1, further comprising a timing member connected between the output of said comparator and said fuel supply means.

3. An apparatus according to claim 5, including means for applying said suppress command signal to said fuel supply means for a selectable period of time.

4. An apparatus according to claim 1, wherein said comparator means is an analog comparator receiving an analog input signal constituting said actual engine speed signal and wherein said means for generating a selectably variable reference speed signal is a voltage divider also generating an analog signal.

5. An apparatus according to claim 4, wherein said voltage divider is adjustable to provide a variable output reference signal.

6. An apparatus according to claim 5, further comprising diode switching means for controlling the magnitude of said reference voltage.

7. An apparatus according to claim 1, wherein said comparator means is a circuit for receiving and processing digital signals.

8. A top speed limiter in combination with a fuel injection system for the breaking-in period of an internal combustion engine, a means for generating a pulse train which indicates engine speed, wherein the system includes a fuel supply means which receives the pulse train, and wherein the top speed limiter comprises:
- a timing circuit means for generating a selectable variable reference speed signal, wherein the circuit means includes a manually adjustable switch;
- means for adjusting said timing circuit means on the basis of an elapsed time signal;
- comparator means for comparing the reference speed signal with the pulse train and for generating a suppress command signal; and
- suppressor means for receiving the pulse train and the suppress command signal, wherein the suppressor means suppresses the pulse train to the fuel supply means to inhibit the supply of fuel to the system on receiving the suppress command signal.

9. An apparatus according to claim 8, further comprising a timing member connected between the output of said comparator and said fuel supply means.

10. An apparatus according to claim 9, including means for applying said suppress command signal to said fuel supply means for a selectable period of time.

11. An apparatus according to claim 8, wherein said comparator circuit is a circuit for receiving and processing digital signals.

* * * * *